United States Patent [19]

Nakamura

[11] 3,710,351

[45] Jan. 9, 1973

[54] DATA TRANSMITTING APPARATUS IN INFORMATION EXCHANGE SYSTEM USING COMMON BUS

[75] Inventor: Hideo Nakamura, Hachioji, Japan

[73] Assignee: Hitachi, Ltd., Tokyo, Japan

[22] Filed: Oct. 12, 1971

[21] Appl. No.: 188,022

[52] U.S. Cl. ................ 340/172.5
[51] Int. Cl. ................ G06f 9/18
[58] Field of Search ................ 340/172.5

[56] References Cited

UNITED STATES PATENTS

| | | | |
|---|---|---|---|
| 3,421,150 | 1/1969 | Quosig et al. | 340/172.5 |
| 2,439,344 | 4/1969 | Stanga | 340/172.5 |
| 3,534,339 | 10/1970 | Rosenblatt | 340/172.5 |
| 2,576,542 | 4/1971 | Floyd | 340/172.5 |

*Primary Examiner*—Gareth D. Shaw
*Attorney*—Craig, Antonelli & Hill

[57] ABSTRACT

In a system wherein a number of computers are coupled to a common bus and the communication among them is effected through the bus, a data transmitting apparatus with which, when a plurality of computers have simultaneously made requests for communication with another computer, the communication is made possible from one of the highest priority level, said data transmitting apparatus being constructed such that larger addresses in binary codes are assigned in the order of the priority levels of data to be transmitted. The address is successively transmitted from an upper-place bit in case of transmitting it to said bus; it is compared with an address on said bus at every bit; and in the case where said address of said apparatus is "0" without coinciding with said address on said bus, said apparatus prohibits transmission of signals ob bits of lower places than the non-coincident place.

5 Claims, 4 Drawing Figures

INVENTOR

HIDEO NAKAMURA

BY Craig, Antonelli & Hill

ATTORNEYS

INVENTOR
HIDEO NAKAMURA
BY Craig, Antonelli & Hill
ATTORNEYS

INVENTOR

HIDEO NAKAMURA

BY Craig, Antonelli & Hill
ATTORNEYS

DATA TRANSMITTING APPARATUS IN INFORMATION EXCHANGE SYSTEM USING COMMON BUS

BACKGROUND OF THE INVENTION

The present invention relates to a system for effecting information exchange among a number of computers coupled to a common bus, and more particularly to an apparatus for transmitting information from the respective computers to the bus.

In certain applications, such as automated systems and numerical control arrangements in a research institute and a hospital, utilizing a number of computers, there has been suggested a system in which the respective computers are coupled to a common bus so that the communication among the computers is carried out through the bus.

When a plurality of computers have simultaneously made requests for communication with another computer in such a system, the control should be such that, in the case where the requests have priority levels, the communication is effected in conformity with the levels, while in case where they have no priority level, the communication is effected in regular order in time division.

The present invention has been made so as to achieve such control with a coupling unit between the computer and the bus.

A method has been suggested in which, in the system thus controlling the data exchange among a number of computers, a central control station common to all the computers is provided at one end of the bus, so as to perform the decisions concerning the priority levels of requests for communication, the time-division control for allowance of use of the bus, etc. at the central control station. The provision of such a central control station, however, has problems in that, e.g., the system becomes more complicated to that extent, and when the station gets out of order, the whole system becomes inoperative.

SUMMARY OF THE INVENTION

It is accordingly the principal object of the present invention to provide a data transmitting apparatus which may effect data exchange among computers without using a central control station as stated above.

Another object of the present invention is to provide an apparatus which, in the case where requests for communication have priority levels, may transmit data in conformity with the priority levels.

Still another object of the present invention is to provide an apparatus which, in case where requests for communication have no priority level, may transmit data in time division in dependence upon the state of use of the bus and in conformity with addresses of the apparatuses themselves coupled to the bus.

In order to accomplish these objects, the system of the present invention is provided with a logical circuit which operates such that an address of the apparatus itself for coupling to the bus or an address assigned to data for transmission and a signal received on the bus at that time are compared at every bit from the bit of the uppermost place, and when they do not coincide and the bit signal of the apparatus is "0", the comparisons of the subsequent bits are stopped to prevent the data from being transmitted.

Other features, objects and advantages of the present invention will be apparent from the following detailed description when read in conjunction with the accompanying drawings.

PREFERRED EMBODIMENTS OF THE INVENTION

Figure 1:
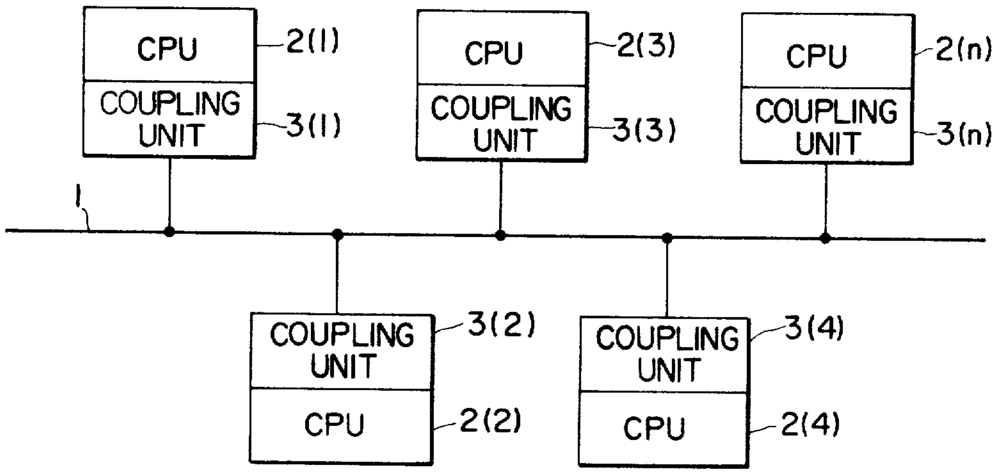
FIG. 1 is a schematic block diagram of a system to which the apparatus of the present invention is applied.
Figure 2:
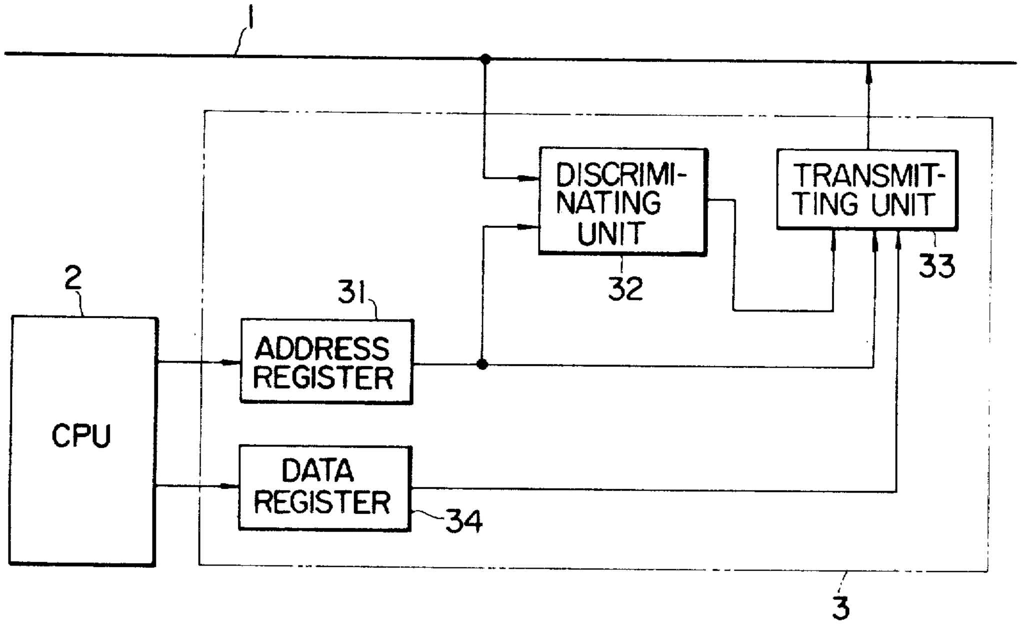
FIG. 2 is a block diagram showing the schematic construction of the apparatus of the present invention.

Referring to FIG. 1, computers 2(1) to 2($n$) for carrying out information exchange are coupled to a common but 1 through coupling units 3(1) to 3($n$), respectively. The coupling unit 3 comprises, as shown in FIG. 2, registers 31 and 34 for storing addresses and data, respectively, a discriminating unit 32 for comparing the address of the coupling unit and an address received on the bus at present, to discriminate the latter, and a transmitting unit 33 for transmitting the address and data to the bus in conformity with the discriminated result.

First of all, description will be made with reference to FIG. 3 of an embodiment in the case where the individual pieces of data to be exchanged have priority levels and where the data are transmitted from the respective coupling units to the bus 1 in accordance with the priority levels.

Figure 3:
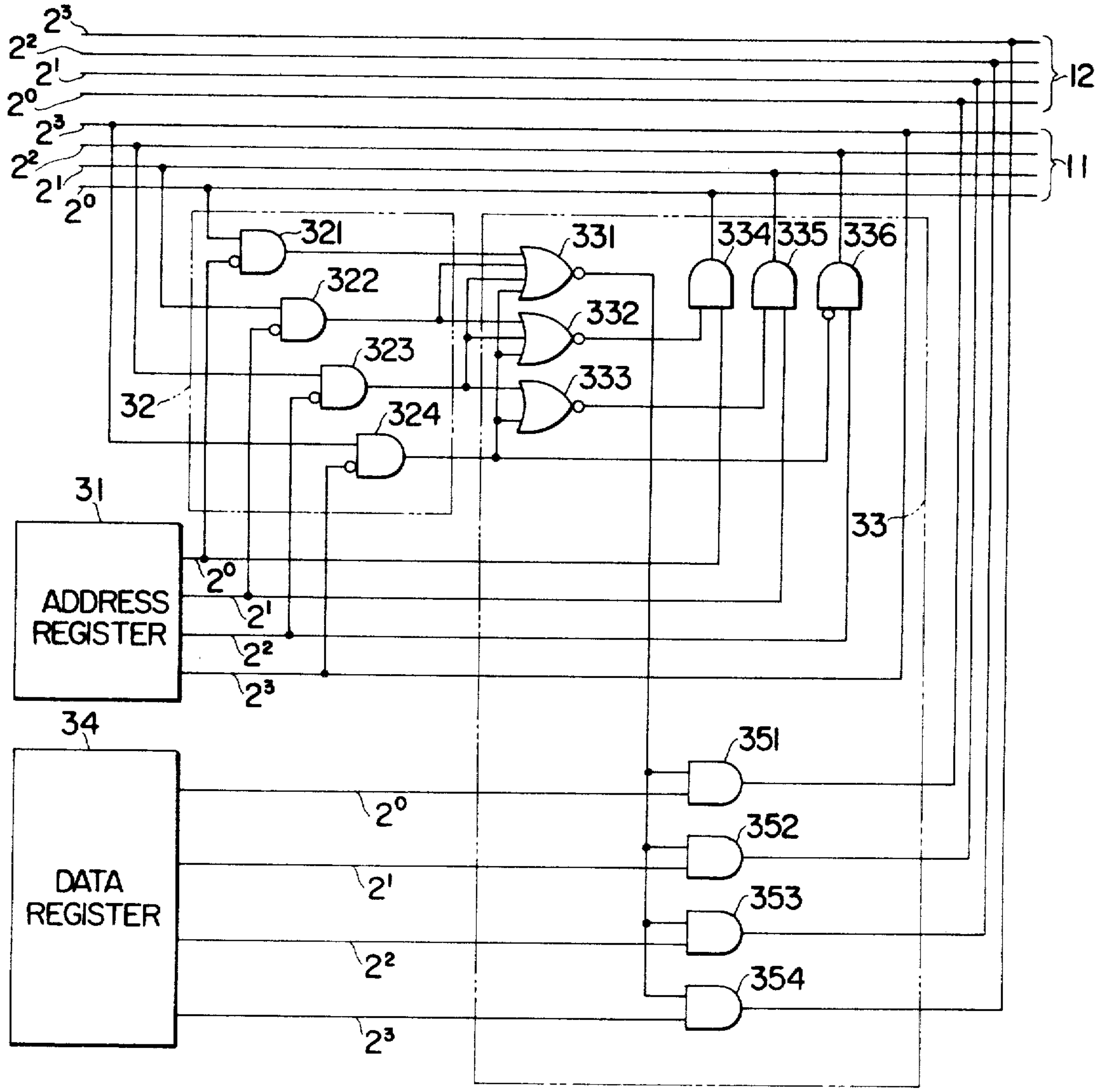
FIGS. 3 and 4 are circuit diagrams of practical constructions, each showing an embodiment of the present invention.

In FIG. 3, the register 34 has stored therein data for transmission from the computer to the bus, while the register 31 has stored therein an address indicating the priority level of the data. Assuming that the register 31 has, for example, 4 bits, the priority levels and the addresses are predetermined as given in Table 1.

TABLE 1

| Priority Level | Address $2^3$ | $2^2$ | $2^1$ | $2^0$ |
|---|---|---|---|---|
| 1 | 1 | 1 | 1 | 1 |
| 2 | 1 | 1 | 1 | 0 |
| 3 | 1 | 1 | 0 | 1 |
| 4 | 1 | 1 | 0 | 0 |
| 5 | 1 | 0 | 1 | 1 |
| 6 | 1 | 0 | 1 | 0 |
| 7 | 1 | 0 | 0 | 1 |
| 8 | 1 | 0 | 0 | 0 |
| 9 | 0 | 1 | 1 | 1 |
| 10 | 0 | 1 | 1 | 0 |
| 11 | 0 | 1 | 0 | 1 |
| 12 | 0 | 1 | 0 | 0 |
| 13 | 0 | 0 | 1 | 1 |
| 14 | 0 | 0 | 1 | 0 |
| 15 | 0 | 0 | 0 | 1 |
| 16 | 0 | 0 | 0 | 0 |

The discriminating unit 32 comprises gate circuits 321 and 324 for providing individual AND logic outputs between negation outputs of the respective bits of the address register 31 and signals of the respective bits received on address lines 11 at present. The gate 321 compares the signal of the bit $2^0$; the gate 322 compares the signal of the bit $2^1$; the gate 323 compares the signal of the bit $2^2$; and the gate 324 compares the signal of the bit $2^3$.

The outputs of the discriminating unit 32 are applied to gates 331 and 333 of the transmitting unit 33. The gate 331 has the outputs of the gates 321 to 324 applied thereto, and provides the negation output of the OR logic with respect thereto. The gate 332 has the outputs of the gates 322 to 324 applied thereto, and provides the negation output of the OR logic with respect thereto. The gate 333 has the outputs of the gates 323 and 324 applied thereto, and provides the negation output of the OR logic with respect thereto.

The signal in the bit $2^0$ of the address register 31 enters an AND gate 334, and is delivered to the address line 11 when the output of the gate 332 is "1". Similarly, the address signal of the $2^1$ bit enters a gate 335, and is delivered to the address line 11 when the output of the gate 333 is "1". Further, the address signal of the $2^2$ bit enters a gate 336, and is delivered to the address line when the output of the gate 324 is "0". The data stored in the data register 34 is applied to AND gates 351 to 354, and pass through the respective gates when the output of the gate 331 is "1", to be delivered to data lines 12.

It is now assumed that the address of data requested for transmission from the apparatus is "1001" at the priority level 7, while the address of another optional apparatus requesting communication is "1010" at the priority level 6.

The address signal of the bit $2^3$ as stored in the address register 31 is directly delivered to the address line 11, and the signal of said line becomes "1". The signal of this address line and the address signal of the bit $2^3$ enter the gate 324, to render its output "0". Since, however, the gate 336 has the negation output of the gate 324 connected thereto, it is opened. However, the signal at the bit $2^2$ of the address register 31 is "0", so that the output of the gate 336 becomes "0". On the other hand, since the signal of the $2^2$ bit of the priority level 6 is also "0", the signal of the $2^2$ bit of the address line becomes "0". The signal of this address line and the signal of the $2^2$ bit of the address register 31 enter the gate 323, so that its output becomes "0". As a result both the inputs to the gate 333 are "0", and hence, its output becomes "1" to open the gate 335. Since, however, the signal applied from the register 31 to the gate 335 is "0", the output thereof is "0". On the other hand, the address signal of the priority level 6 is "1" at the $2^1$ bit, and it enters the gate 322. The bit $2^1$ of the address register 31 is "0", with the result that the output of the gate 322 becomes "1". Accordingly, the output of the gate 332 becomes "0" to close the gate 334, thereby prohibiting transmission of the signal of the bit $2^0$ of the address register 31.

In brief, when the computers have made requests for communication in order to transmit data having the addresses of the priority level 6 and the priority level 7, the address of the priority level 6 is transmitted to the address lines, and simultaneously, the data are transmitted to the data lines 12.

As is understood also from Table 1, when addresses of higher priority levels and addresses of lower priority levels are compared at every bit in the order from upper places to lower places, the addresses of lower priority levels necessarily become "0" earlier. The above-described system of the present invention is constructed such that both the addresses are compared bit-by-bit, and the address becoming "0" at the earliest but is prohibited from transmission. Therefore, the signal on the address line is necessarily the address signal which is of the highest priority level compared to the addresses under request for communication.

In the case in which the address signals of all the bits may be transmitted, the output of the gate 331 is "1", and data stored in the data register 34 passes through the gates 351 to 354 to be transmitted to the data lines 12, respectively.

While the foregoing embodiment transmits in parallel, addresses and data to the bus, a series transmission is also possible. In this case, addresses may be compared bit-by-bit in synchronism with a clock pulse, to prohibit transmission of the address from becoming "0" in the earliest bit position.

While FIG. 3 depicts the construction in the case where the individual pieces of data for data exchange have priority levels and where the data is transmitted from the respective apparatus, coupled to the bus, in conformity with the priority levels, the present invention is also applicable to information-exchange systems having no such priority levels.

More specifically, in the latter systems, the apparatuses coupled to the bus themselves are assigned respective specific addresses, and when there are a number of apparatuses making requests for communication, data is transmitted in time division in conformity with the order of the addresses.

Figure 4:
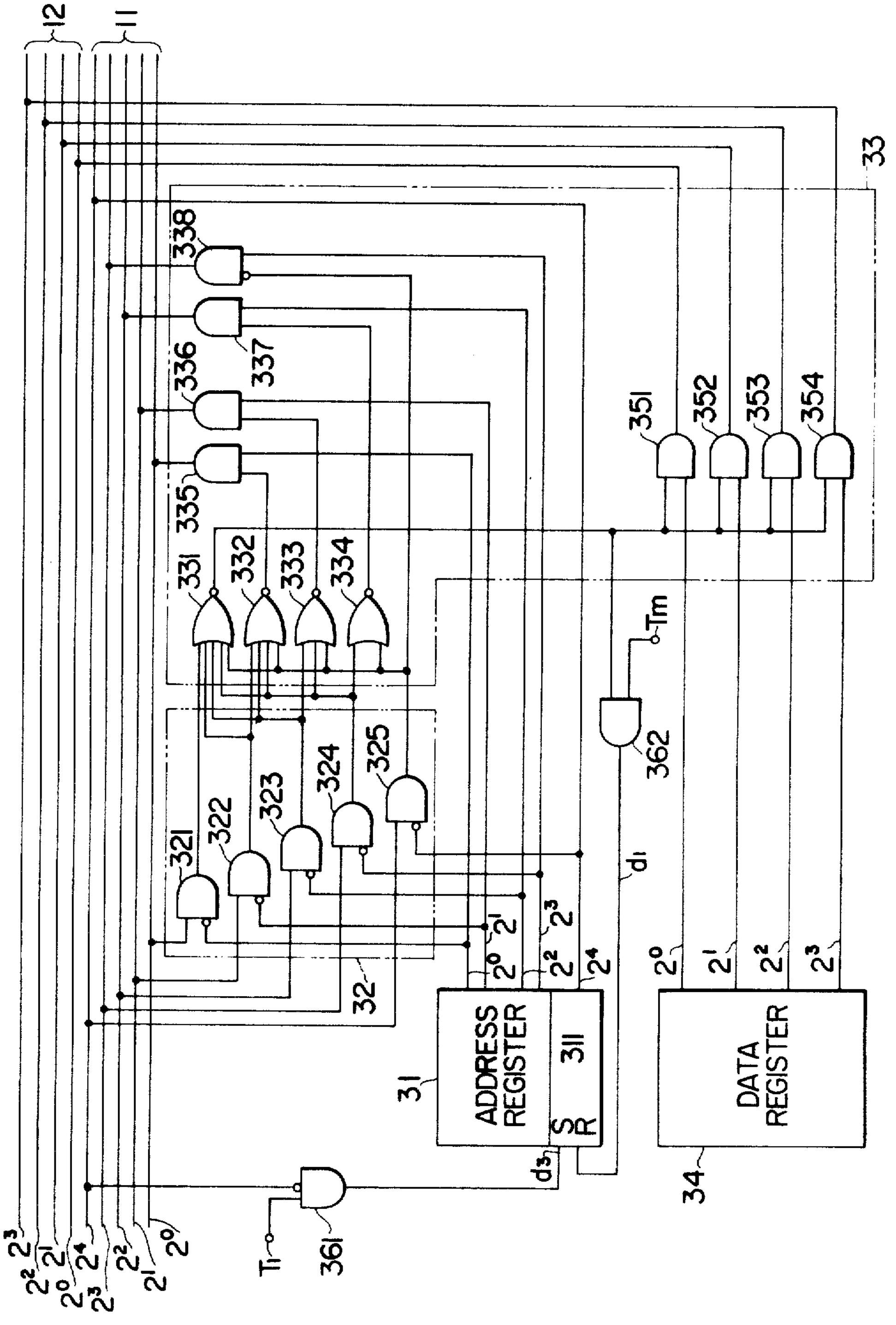

FIG. 4 shows a practical embodiment of such a system. The bus 1 has the address lines 11, which consist of five lines corresponding to the respective bits $2^0$ to $2^4$, and the data lines 12, which consist of four lines corresponding to the respective bits $2^0$ to $2^3$. The addresses specific to the respective apparatuses are set in the register 31. To the uppermost place of the register 31, a memory element 311 of one bit capacity is added. Applied to a set terminal S of the memory element 311 is the output of a gate 361 which produces the AND logic output between a negation signal of the $2^4$-bit address line and a timing pulse $T_1$. Applied to a reset terminal R is the output of a gate 362 which produces the AND logic output between the output of the gate 331 and a timing pulse $T_m$.

Thus, while the stored contents of the register 31 are fixed and the contents of the one-bit memory element 311 are variable, it is considered in the system of this embodiment that both the stored contents are put together as one group of addresses. Numeral 32 designates the discriminating unit as has been stated with reference to FIG. 3, which unit provides the logical products between negation signals of the contents of the register 31 and memory element 311 and signals of the respective bits $2^0$ to $2^4$ of the address lines 11. The construction of the other means is the same as in FIG. 3.

Now, when the buses 11 and 12 are used for a communication between other apparatuses, the signal of the $2^4$ bit of the address lines 11 is "1". Accordingly, "0" is added to the set terminal S of the one-bit memory element 311. As a result, the $2^4$ bit signal of said element 311 is "0", which is applied to a gate 325. Since its output becomes "1", the gate 331 produces a "0" irrespective of the values of other inputs, the "0" output is delivered to the AND gates 351 to 354. Therefore, the contents of the data register 34 are never transmitted to the data lines 12.

Description will now be made of a case where the apparatus shown in FIG. 4 and its address are assumed to be A and "1010", respectively, and where this apparatus and another apparatus B having a different address "1001" have simultaneously requested use of the bus.

In this case, the bit signal on line $2^4$ of the address lines is "0" at first. Accordingly, the registers 311 of both the apparatuses A and B are set at "1" by the timing pulse $T_1$ for starting the transmission of address signals.

The bit signal "1" of each register 311 is directly delivered to the $2^4$ bit line of the address lines 11. Since this signal "1" and the bit signal "1" of each register 311 are applied to each gate 325, the output thereof becomes "0", which is inverted to be applied to the gate 338. The $2^3$ bit of the registers 31 is "1" in both the apparatuses A and B, so that the outputs of the gates 338 become "1" in both the apparatuses. Accordingly, the $2^3$ bit line of the address lines 11 becomes "1". Similar logic operations are effected at the $2^2$ bit, to bring the respective gates of the apparatuses A and B into the same states. More specifically, the outputs of the gates 323 to 325 become "0", while those of the gates 333 and 334 become "1". As a result, "1" is applied to the $2^4$ bit line of the address lines 11, "1" is applied to the $2^3$ bit line, and "0" is applied to the $2^2$ bit line. Since the bit signal of $2^1$ of the register 31 of the apparatus A is "1" and the output of the gate 333 is also "1", the output of the gate 336 becomes "1" and the $2^1$ bit line of the address lines 11 becomes "1". The gate 322 of the apparatus A has as its inputs the bit signal "1" of the register 31 and the signal "1" of the $2^1$ bit line of the address lines 11, and its output becomes "0". As a result, the output of the gate 332 of the apparatus A becomes "1". On the other hand, the gate 322 of the apparatus B has as its inputs the bit signal "0" of $2^1$ of the register 31 and the signal "1" of the $2^1$ bit line of the address lines 11, and its output becomes "1". The output signal "1" of the gate 322 is applied to the gates 332 and 331, to render their outputs "0". As a result, the apparatus B closes the gate 335 by means of the output signal "0" of the gate 332, and prohibits the transmission of the bit signal of $2^0$ of the register 31 to the address line 11. In addition, the output "0" of the gate 331 closes the gates 351 to 354, thereby prohibiting the transmission of data from the register 34.

Although the output signal "1" of the gate 332 of the apparatus A opens the gate 335, the bit signal of $2^0$ of the register 31 is "0". The output of the gate 335 is therefore made "0", with the result that the bit line of $2^0$ of the address lines 11 is made "0". The gate 321 has as its inputs the bit signal "0" of $2^0$ of the register 31 and the signal "0" of the $2^0$ bit line of the address lines 11, and its output becomes "0". As a result, the apparatus A, all the outputs of the gates 321 to 325 become "0", while the output of the gate 331 becomes "1". The output signal "1" of the gate 331 opens the gates 351 to 354, and the data of the register 34 is transmitted to the data lines 12.

In this way, one word or one section of data are transmitted from the register 34 of the apparatus A. Then, the timing pulse $T_m$ is applied to the gate 362, whose output pulse resets the register 311. Since, herein, the apparatus B having the other address "1001" is making the request for use of the bus, the bit signal of $2^4$ of the address lines 11 is still "1". Accordingly, the output of the gate 325 becomes "1" and that of the gate 331 becomes "0", which is applied to the AND gates 351 to 354 for the data transmission to close them. For this reason, the transmission of the data from the apparatus illustrated in FIG. 4 is at once stopped, while the data transmission of the apparatus B having the different address "1001" is carried out. Thereafter, the operations are alternately performed. That is to say, in case where two or more apparatuses have simultaneously made the requests for use of the bus, the transmission of one word or one section of data is effected alternately.

While the above described embodiment has been presented for the case where the addresses and data are transmitted to the bus in parallel, it is to be understood that the embodiment is also applicable to the case where they are transmitted in series.

As apparent from the foregoing description, the system of the present invention is constructed such that, when data to be transmitted from computers to a bus has priority levels, it is transmitted in conformity with the priority, while when the data has no such priority, it is transmitted in time division in the order conforming to predetermined, fixed addresses. The judgment of the property of the transmission of addresses may be made merely between individual apparatus and signals of the bus, and is independent of the states of other apparatuses, so that the number of apparatuses coupled to the same bus is subject to no limitation.

With the prior-art system, the transmission of data from the respective apparatuses coupled to the bus has been subject to the centralized control by the central control station, so that if the station fails, the whole system breaks down. In contrast, with the system of the present invention, even if one apparatus gets out of order and becomes incapable of transmitting addresses, the other apparatuses are capable of transmitting signals without being influenced thereby. Accordingly, the system of the invention may enhance reliability over the prior-art system.

Even in case where requests for communication have been produced at random from a number of apparatuses, no confusion occurs and a regular transmission of data is effected in conformity with addresses in the system of the present invention.

What I claim is:

1. A data transmitting apparatus which, in order to effect information exchange among a plurality of computers coupled to a bus, transmits data from the computer to said bus, comprising:

a. a data register for temporarily storing said data from said computer, b. an address register for temporarily storing address signals from the bit $2^0$ to the bit $2^n$, c. a discriminating unit including first logic gate means for producing for each bit the logical product between an address signal being transmitted to said bus and a negation signal of a signal stored at the address register, and d. a transmitting unit including second logic gate means for producing a negation signal of an output of said first logic gate means, first gate means for controlling transmission of said data from said data register to said bus in accordance with the output of said second logic gate means corresponding to the bit of the lowermost place, and second gate means connected between said address register and said transmission bus for controlling transmission to said bus of the address signals of the bits in a position one order lower than the bits in said address register in accordance with the outputs of said second logic gate means.

2. A data transmitting apparatus according to claim 1, wherein said first logic gate means comprises a group of $n + 1$ logic gates corresponding to address signals of $n + 1$ bits, and wherein said second logic gate means comprises a group of logic gates for applying negation signals of logical sums between output of said first logic gate at every bit and outputs of logic gates of all the bits corresponding to orders higher than the bits in said address register.

3. A data transmitting apparatus according to claim 1, wherein binary signals of values conforming to priority levels of the data to be transmitted to said bus are assigned to said address register from said computer.

4. A data transmitting apparatus according to claim 1, wherein said address register has predetermined, fixed addresses stored therein, and has a memory element of one bit added at the $2^{n+1}$ bit, stored contents in said memory element being variable in response to a signal on said bus.

5. A data transmitting apparatus according to claim 4, wherein said memory element of one bit is set by an AND logic output between a negation signal of the address signal of the $2^{n+1}$ bit of said bus and a timing pulse, while it is reset by an AND logical output between a control signal of said first gate and a timing pulse.

* * * * *